US006969078B2

(12) United States Patent
Liao

(10) Patent No.: US 6,969,078 B2
(45) Date of Patent: Nov. 29, 2005

(54) THIRD WHEEL COLLAPSING DEVICE FOR A GOLF CLUB CART

(75) Inventor: Gordon Liao, Tainan Hsien (TW)

(73) Assignee: Unique Product & Design Co., Ltd., Tainan Hsien (TW)

( * ) Notice: Subject to any disclaimer, the term of this patent is extended or adjusted under 35 U.S.C. 154(b) by 165 days.

(21) Appl. No.: 10/725,497

(22) Filed: Dec. 3, 2003

(65) Prior Publication Data

US 2005/0121864 A1    Jun. 9, 2005

(51) Int. Cl.⁷ .................... B62B 1/00; B62D 61/06; F16B 21/00; F16B 7/04
(52) U.S. Cl. .................... 280/38; 280/654; 280/651; 280/62; 280/767; 280/DIG. 6; 403/322.4; 403/368; 403/83
(58) Field of Search .................... 280/654, 651, 280/655, 646, 645, 47.34, 47.27, 47.24, 43.1, 280/DIG. 6, 62, 767.38; D34/15; 403/83, 403/84, 322.4, 368, 367

(56) References Cited

U.S. PATENT DOCUMENTS

| | | | | | |
|---|---|---|---|---|---|
| 4,289,324 A | * | 9/1981 | Nemeth | ...................... | 280/38 |
| 4,657,100 A | * | 4/1987 | Lewis | ...................... | 180/19.1 |
| 5,433,552 A | * | 7/1995 | Thyu | ...................... | 403/378 |
| 5,865,560 A | * | 2/1999 | Mercat et al. | ........... | 403/322.4 |
| 6,131,917 A | * | 10/2000 | Walsh | ...................... | 280/43.1 |
| 6,276,760 B1 | * | 8/2001 | Everett | ................... | 301/124.2 |
| 6,641,228 B2 | * | 11/2003 | Liu | ....................... | 301/111.06 |
| 6,719,319 B2 | * | 4/2004 | Liao | .......................... | 280/654 |
| 6,746,058 B2 | * | 6/2004 | Kienzler | .................... | 292/175 |

* cited by examiner

Primary Examiner—Christopher P. Ellis
Assistant Examiner—G B Klebe
(74) Attorney, Agent, or Firm—Bacon & Thomas PLLC

(57) ABSTRACT

A third wheel collapsing device for a golf club cart includes a third wheel support unit consisting of a connect base having a fitting member with an upper inclined surface, and a lock block on the upper inclined surface. A spring chamber is continually formed in both the fitting member and the lock block for receiving a spring therein. A control rod is movably fitted in a center hole of both the fitting member and the lock block and through the spring, and has its lower end pivotally connected with an eccentric plate. The eccentric plate is swung up or down to move down or move up the control rod so that the lock block is also moved down to alters its position a little to firmly contact with an inner surface of a main frame of a golf club cart or to separate from the main frame, assembling or disassembling the third wheel support unit with or from the main frame.

1 Claim, 11 Drawing Sheets

THIRD WHEEL COLLAPSING DEVICE FOR A GOLF CLUB CART

BACKGROUND OF THE INVENTION

1. Field of the Invention

This invention relates to a third wheel collapsing device for a golf club cart, particularly to one conveniently collapsible and stable after expanded out.

2. Description of the Prior Art

A conventional golf club cart shown in FIG. 1 includes a main frame 10, a support member 11 respectively fixed on an upper portion and a lower portion of the main frame 10, an intermediate support frame 12 connected with an intermediate portion of the main frame 10 and extending to two sides of the main frame 10 and pivotally connected with two rear wheels 13, a handle 14 fixed on an upper end of the main frame 10 for pushing or pulling the golf club cart 1, and a third wheel supporter 15 having its lower end fixed firmly with the bottom end of the main frame 10 with a bolt 16 having its one end pivotally connected with a third wheel 17.

Though the conventional golf club cart 1 is very stable in movement, but still has some drawbacks as described below.

1. The third wheel supporter 15 is fixed firmly by the bolt 16, and it must be expanded or collapsed with a user's body bent for screwing the bolt 16, inconvenient to handle.

2. Should the bolt 16 be not screwed tight, it might easily fall off the third wheel supporter 15, and if worse, may be lost in using the golf club cart.

3. If the third wheel collapsing device according to the invention is applied to a three folding golf club cart, the rotatable third wheel 17 may affect the collapsed size of the golf club cart, becoming rather large as shown in FIG. 2.

Another conventional golf club cart shown in FIG. 3 includes a third wheel support frame 20, and a locking unit 3 provided between the main frame 10 and the third wheel support frame 20. The locking unit 3 controls relative location between the third wheel support frame 20 and the main frame 10, having a push button 30 for fixing firmly the third wheel support frame 20 at the inside of the main frame 10, and when the third wheel is provided separable to slide out from between the main frame 10 with the push button 30 pressed, there should be enough space for the third wheel to slide down from the inside of the main frame 10. Nevertheless, the push button 30 itself has no function to tightly press the third wheel support frame 20 so the third wheel cannot be stably run straight forward.

SUMMARY OF THE INVENTION

The objective of the invention is to offer a third wheel collapsing device for a golf club cart, which can secure the third wheel stably after expanded out, and easily collapse the third wheel.

The feature of the invention is a third wheel support unit consisting of a connect base having a fitting member with an upper inclined surface, a lock block on the upper inclined surface, a spring chamber continually formed in both the fitting member and the lock block for receiving a spring therein, a control rod extending from under through the connect base, the fitting member and the lock block to expose out of the lock block and screwed with a nut stably. Further the control rod has its lower end pivotally connected with an eccentric plate. When the eccentric plate is swung up, the control rod is moved down so that the lock block is also moved down and also slides a little on the upper inclined surface of the fitting member, becoming not aligned with the fitting block. Then the lock block may firmly contact the inner surface of the main frame of a golf club cart to secure firmly the third wheel support unit with the main frame. If the eccentric plate is swung down, the control rod is released to move up by recovered elasticity of the spring, with the lock block also moved up to separate from the inner surface of the main frame, freeing the third wheel support unit from the main control, i.e. permitting the third wheel collapsible from the golf club cart.

BRIEF DESCRIPTION OF DRAWINGS

This invention will be better understood by referring to the accompanying drawings, wherein.

DETAILED DESCRIPTION OF THE PREFERRED

Emodiment

Figure 1:
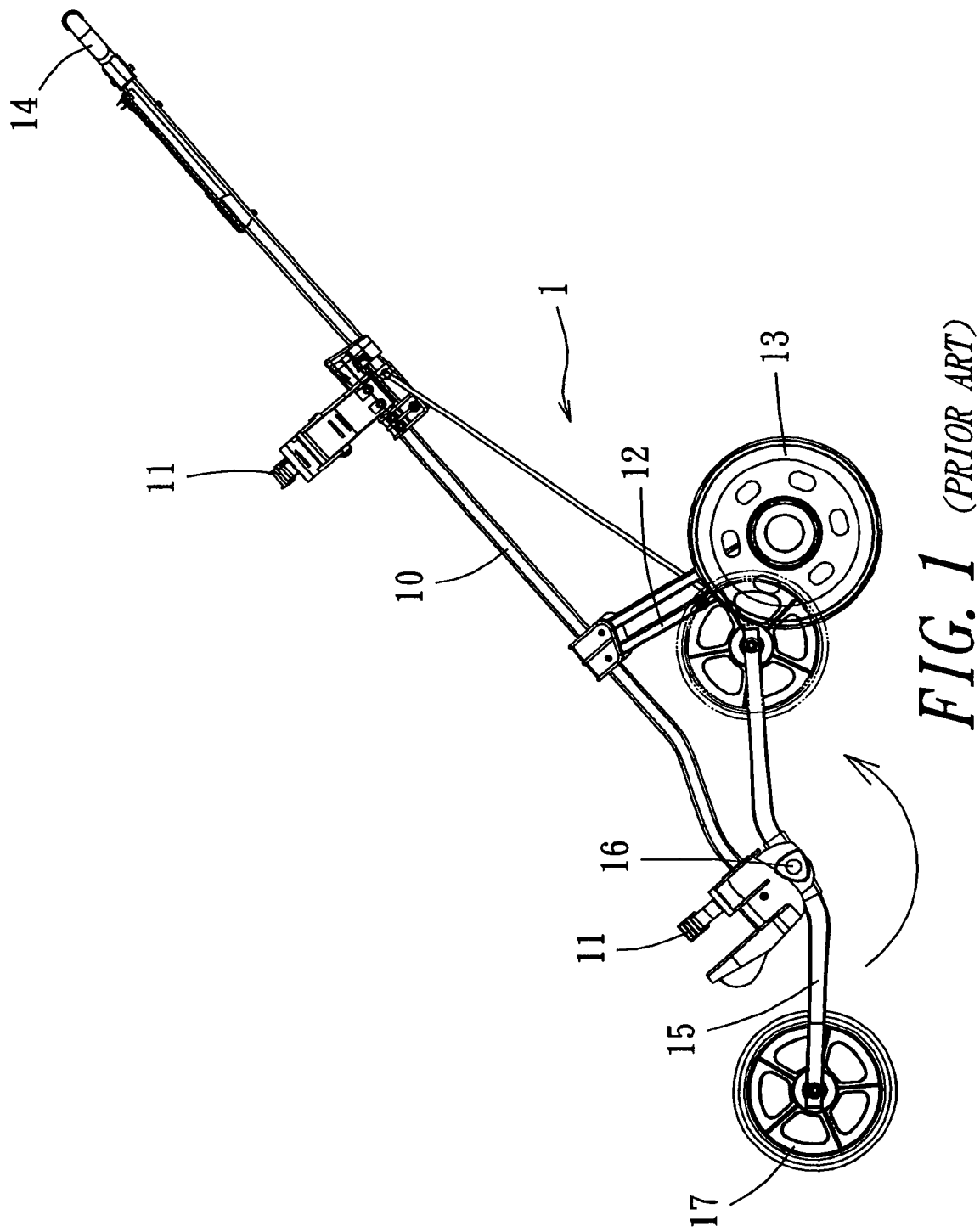
FIG. 1 is a perspective view of a first conventional golf club cart.
Figure 2:
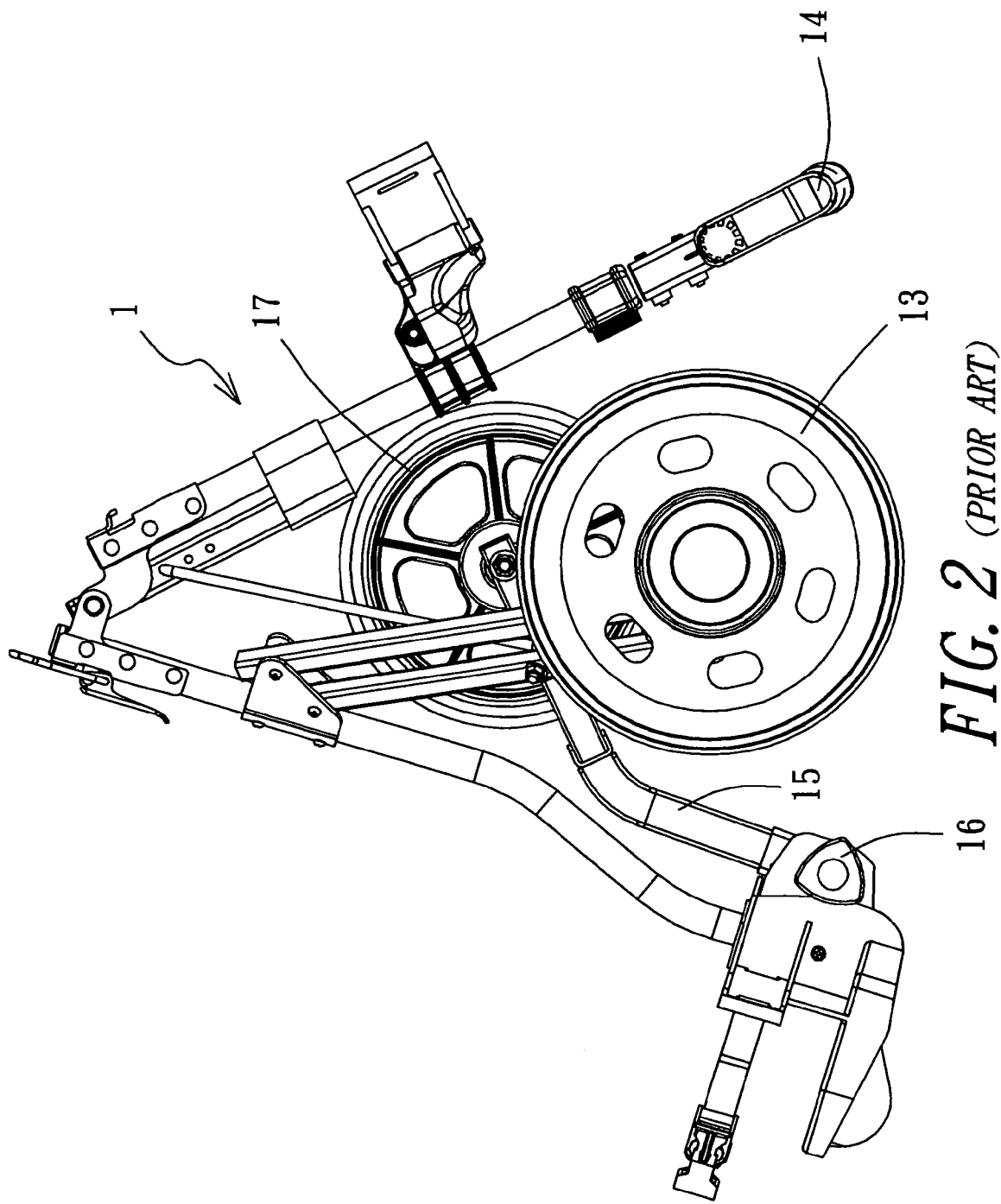
FIG. 2 is a side view of the first conventional three folding golf club cart in a collapsed in three folds.
Figure 3:
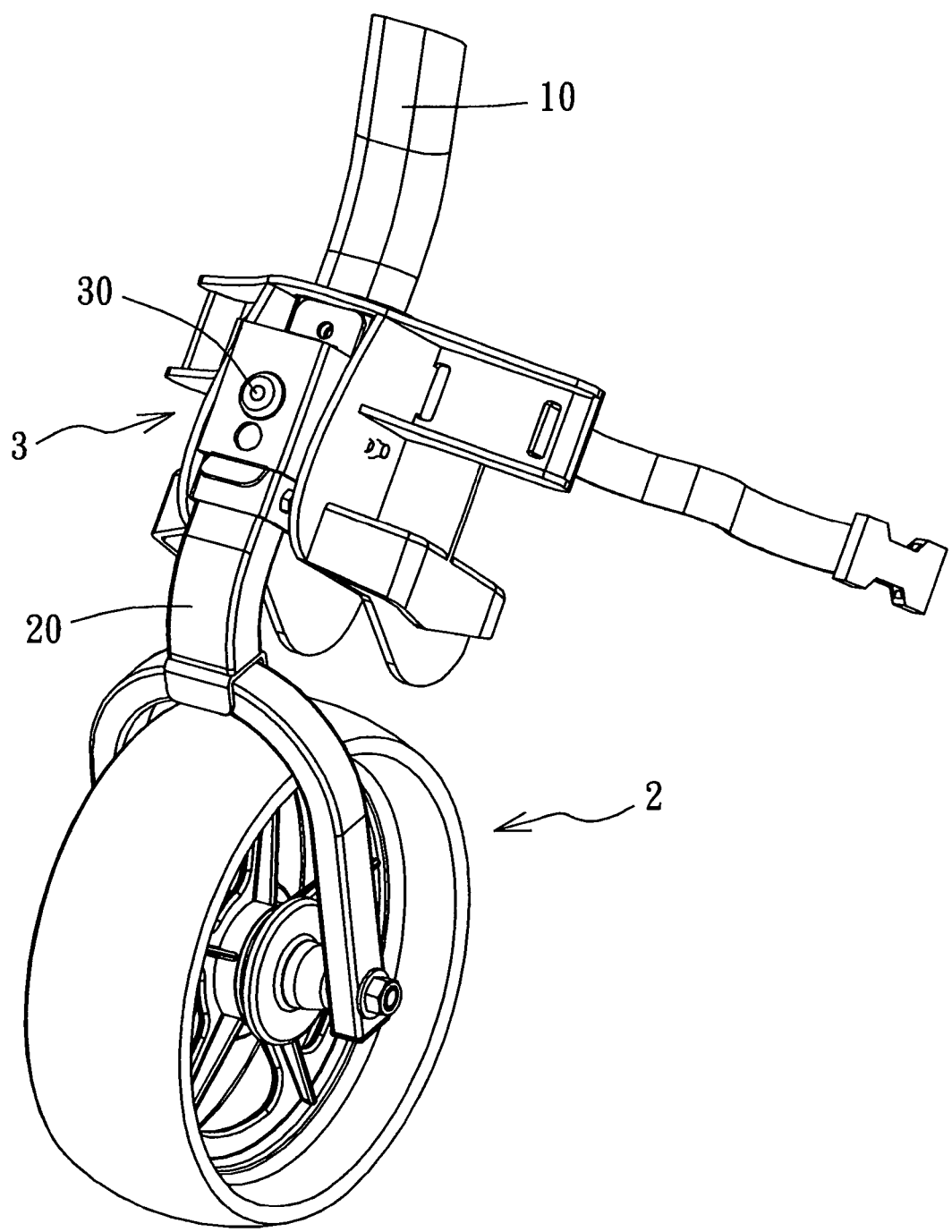
FIG. 3 is a perspective view of a third wheel of another conventional golf club cart.
Figure 4:
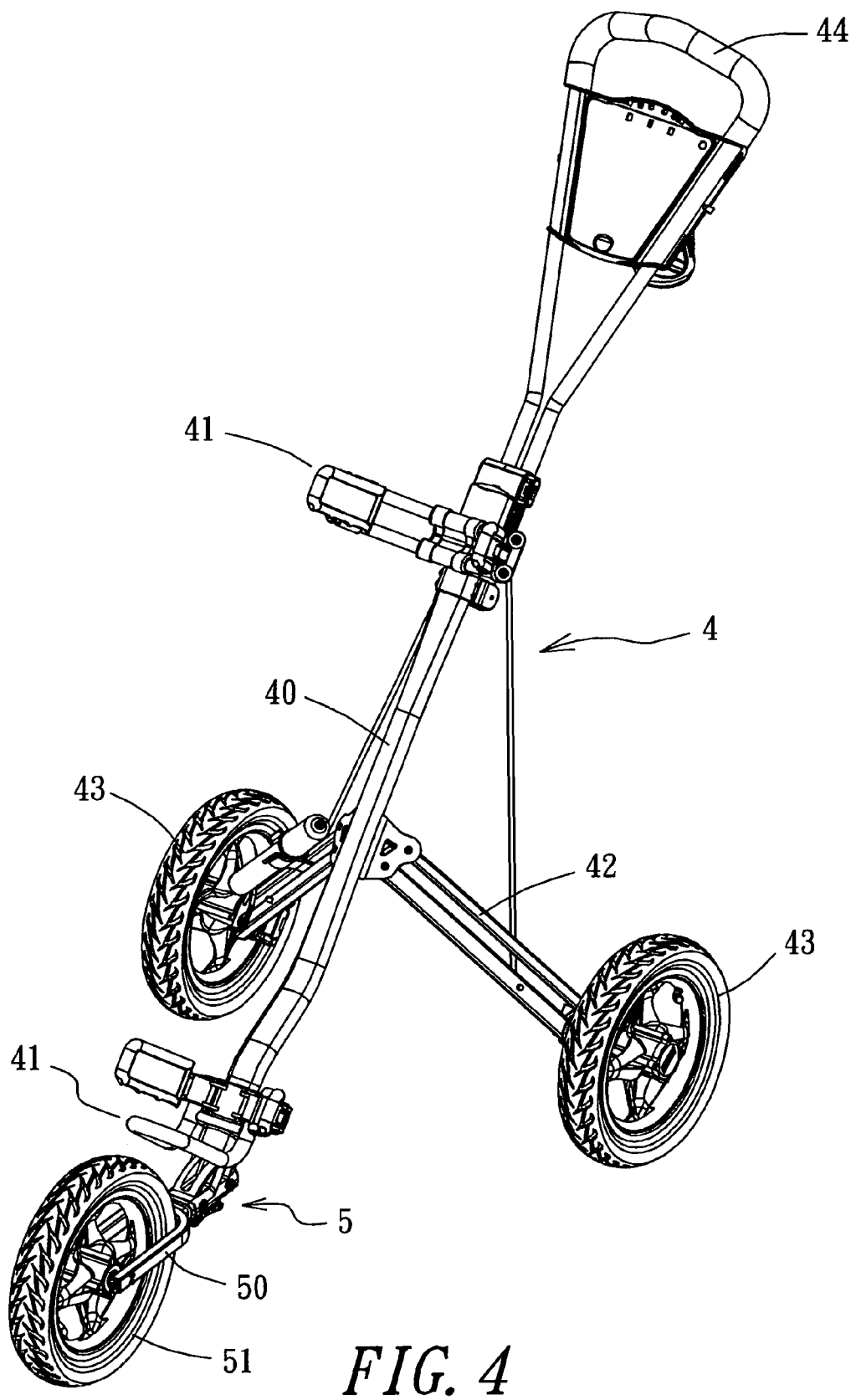
FIG. 4 is a perspective view of, a golf club cart expanded out in the present invention.

A preferred embodiment of a third wheel collapsing device for a golf club cart in the present invention, as shown in FIG. 4, includes a main frame 40, an intermediate support frame 42, two rear wheels 43, a handle 44, a third wheel support unit 5 as main components combined together.

The main frame 40 has its upper portion provided with an upper support member 41 and its lower portion provided with a lower support member 41 for supporting a golf club bag between the two support members 41, 41.

The intermediate support frame 42 is positioned at the intermediate portion of the main frame 40, extending to the right side and the left side of the main frame 40 for respectively connecting pivotally with the rear wheel 43.

The handle 44 is fixed on an upper end of the main frame 40 for a user to hold for moving the golf club cart 4.

Figure 5:
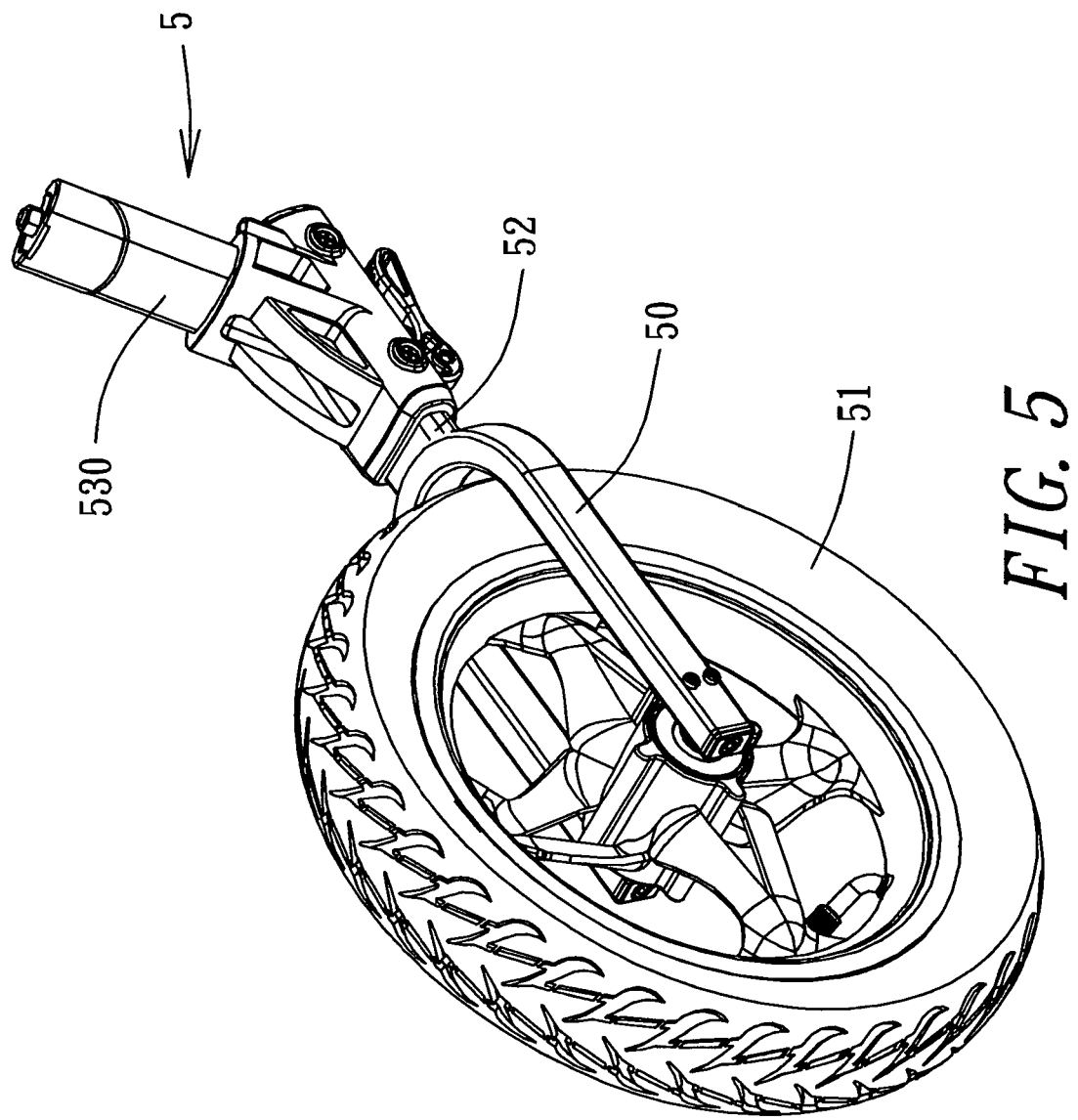
FIG. 5 is a perspective view of a third wheel of the golf club cart in the present invention.
Figure 6:
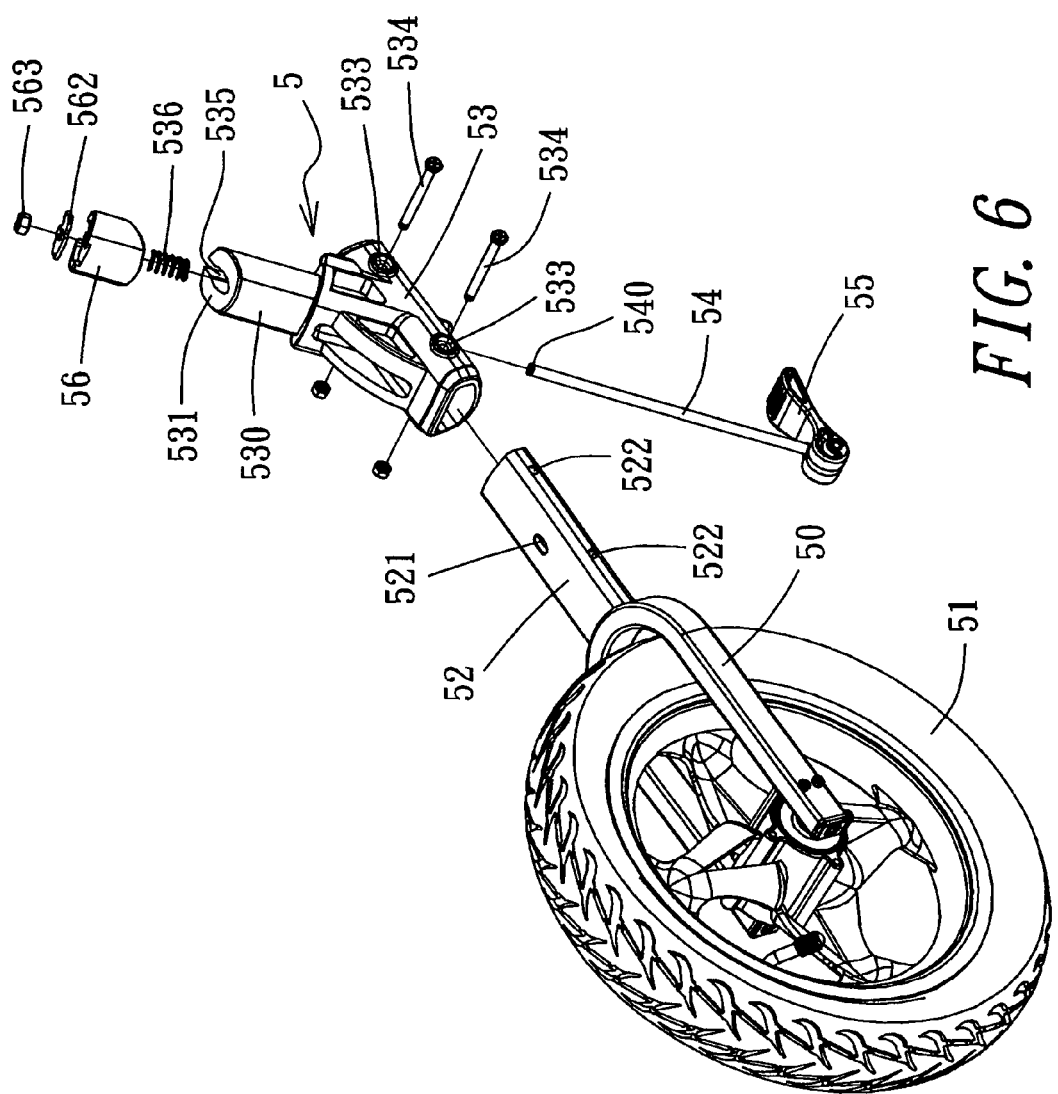
FIG. 6 is an exploded perspective view of the third wheel and a third wheel support unit in the present invention.

The third wheel support unit 5, as shown in FIGS. 5 and 6, consists of a U-shaped frame 50, an arm 52, a connect base 53, a control rod 54, and a lock block 56.

The U-shaped frame 50 has an opening with a third wheel 51 pivotally connected therein, an arm 52 extending out from the closed end and having a center hole 521 in an intermediate portion and two sidewise holes 522 in a side surface.

Figure 7:
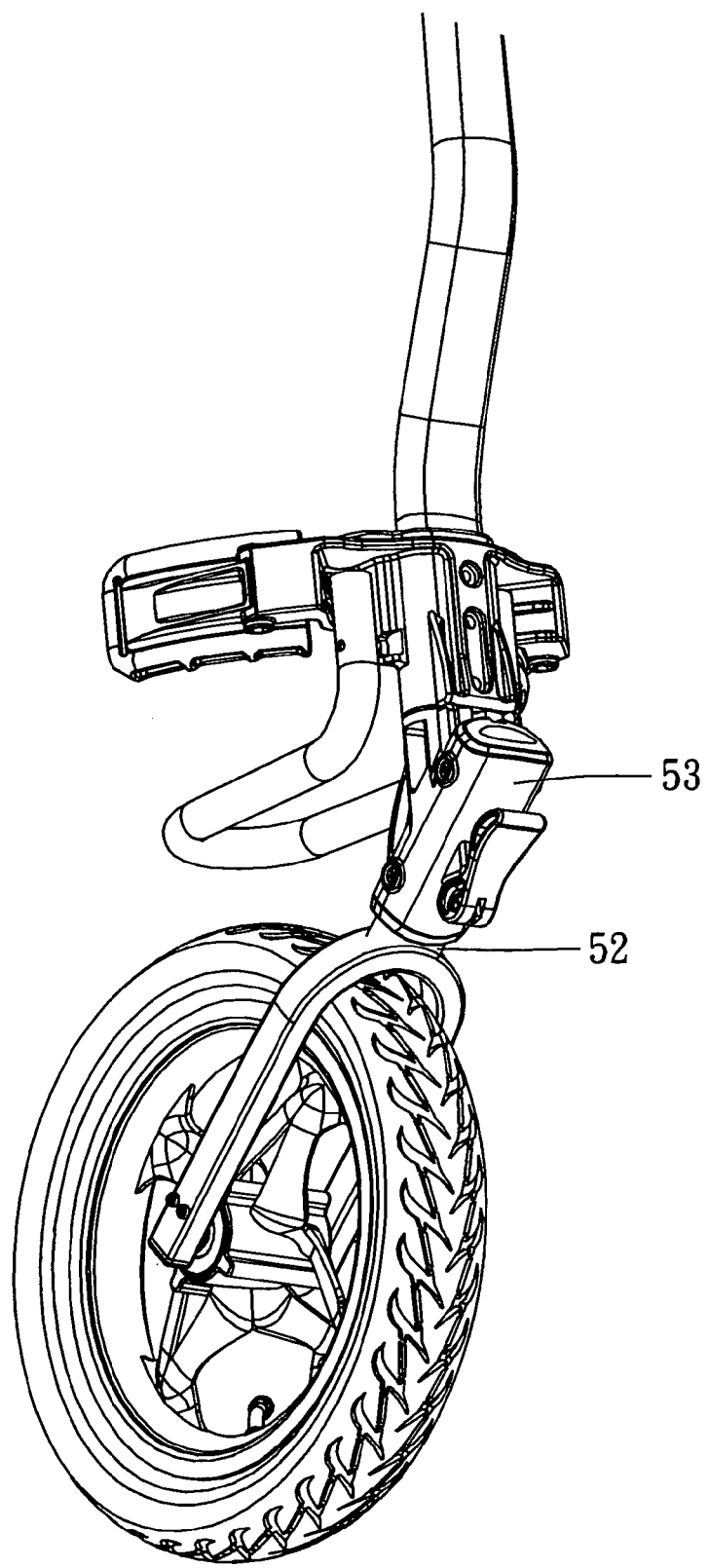
FIG. 7 is a perspective view of the third wheel connected with the third wheel support unit in the present invention.
Figure 8:
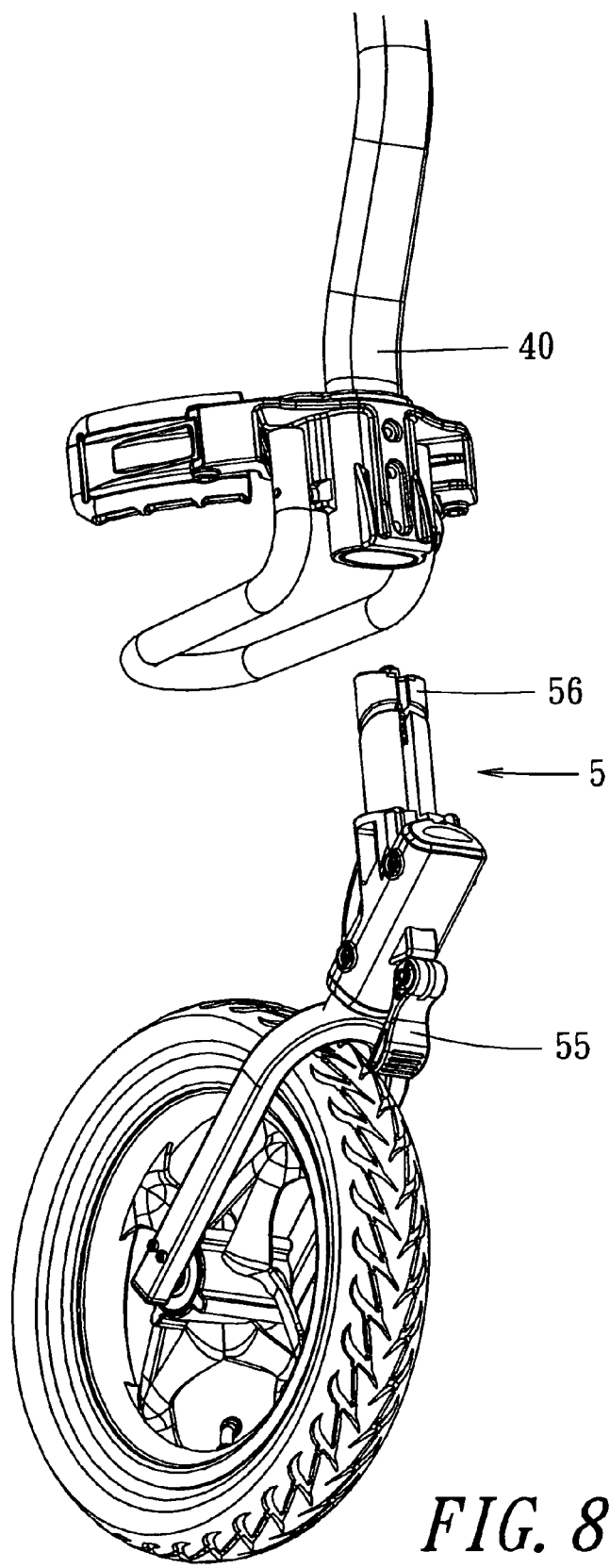
FIG. 8 is a perspective view of the third wheel together with the third support unit collapsed from the main frame of a golf club cart in the present invention.
Figure 9:
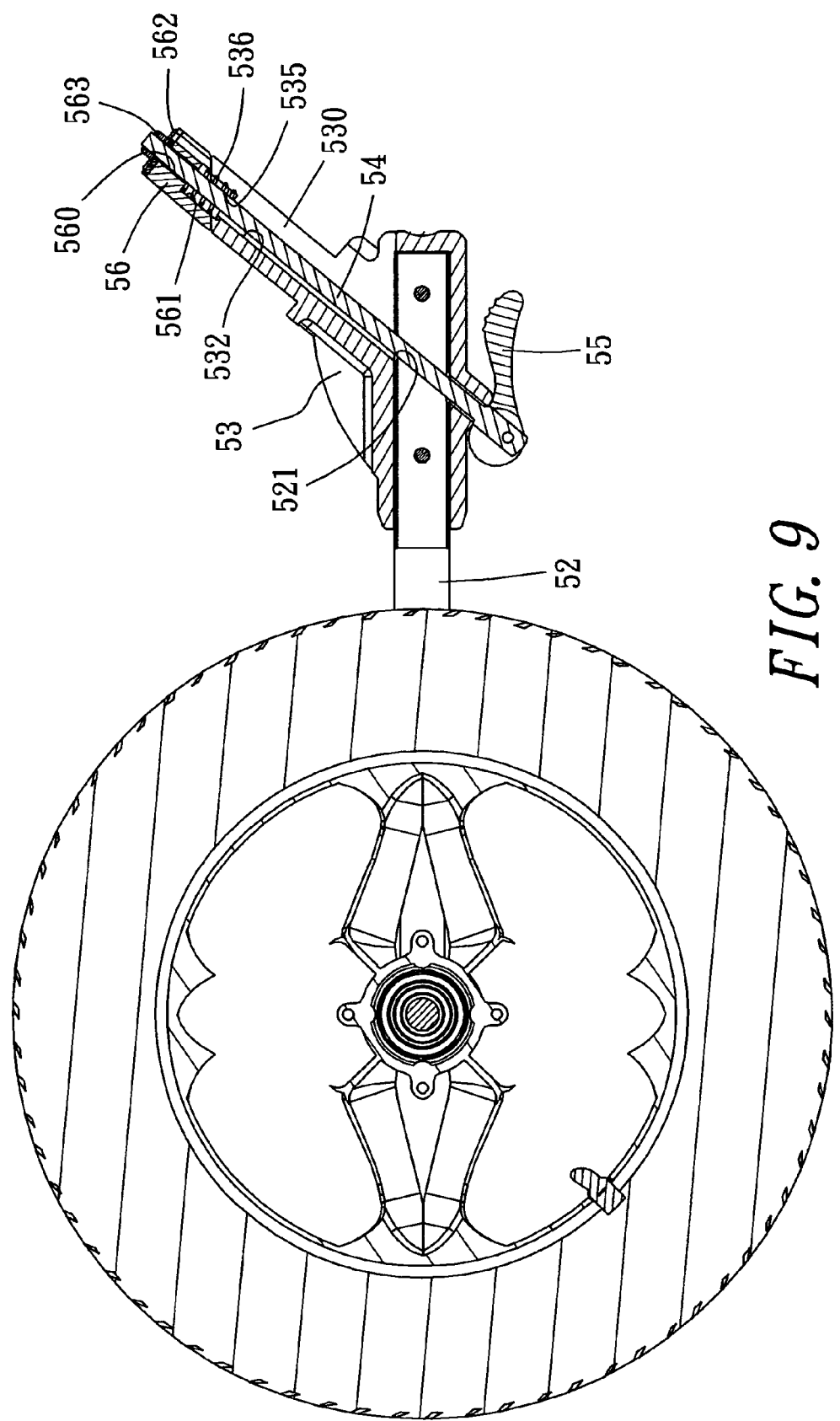
FIG. 9 is a cross-sectional view of the third wheel combined with the third wheel support unit in the present invention.

The connect base 53 has a hollow interior to fit around the arm 52 as shown in FIG. 7, having a fitting member 530 extending obliquely from an upper end of the connect base 53 and having an upper inclined surface 531 and a center lengthwise hole 532 to communicate with the center hole 521 of the arm 52, as shown in FIG. 9. Further, the U-shaped frame 50 has two sidewise lock holes 533 at two sides of the lower end of the center hole 521 aligned with the two sidewise holes 522 of the arm 52. Then bolts 534 screw in the lock holes 533 and the sidewise holes 522 so as to secure the connect base 53 with the arm 52 stably. Further, a spring chamber 535 is formed in a top portion of the fitting member 530 for receiving a spring 536 therein.

The control rod 54 is elongate, having a lower end pivotally connected with an eccentric plate 55 and an upper threaded end 540, extending from under through the center hole 521 of the arm 52 and then through the center hole 532 of the fitting member 530.

The lock block 56 is positioned on the inclined surface 531 of the fitting member 530 having a center hole 560 aligning with the center hole 532 of the fitting member 530, as shown in FIG. 9. The center hole 560 has its lower portion formed with a spring chamber 561 aligned with the spring chamber 535 of the fitting member 530 for receiving the upper portion of the spring 536 therein. Then the control rod 54 continues to extend through the center hole 560 out of the center hole 560, with a washer 562 and a nut 563 to screw with the threaded end 540 of the control rod 54 to lock it stably.

Figure 10:
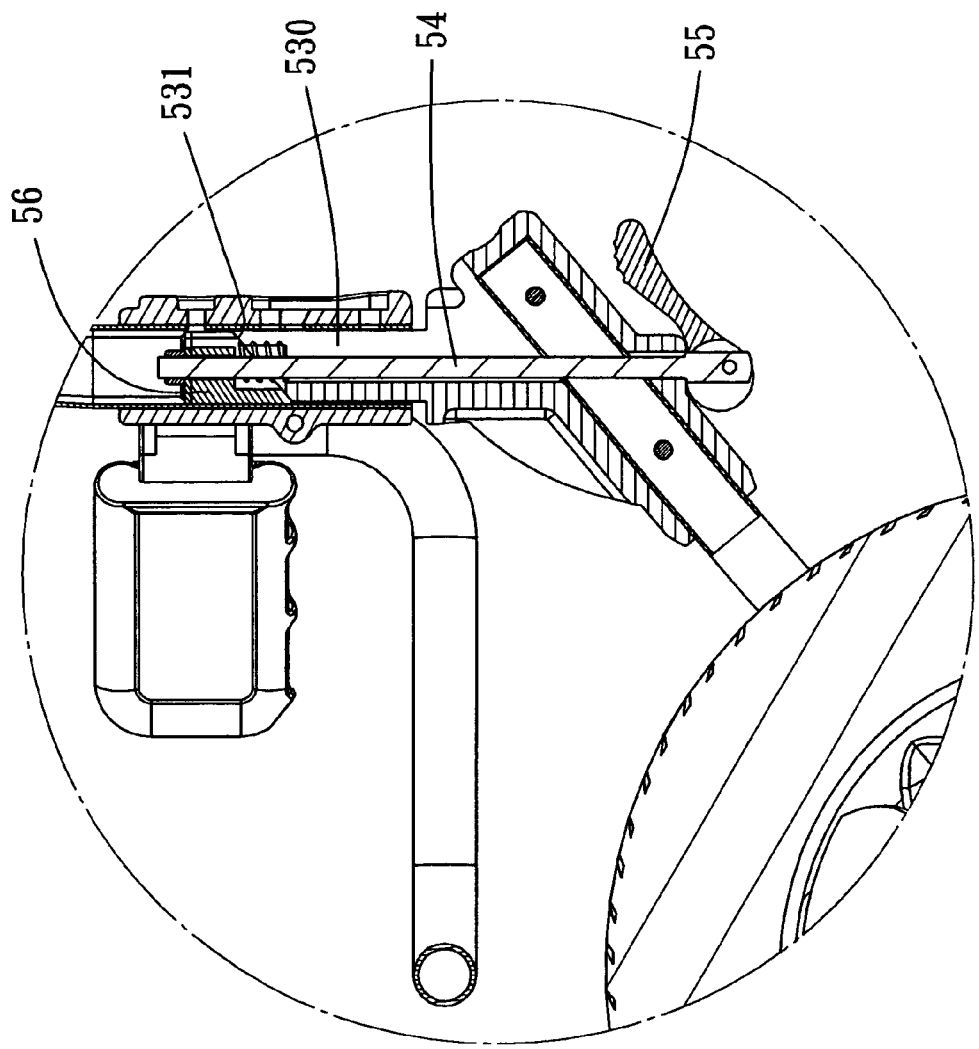
FIG. 10 is a partial magnified view of FIG. 9.

FIGS. 7 and 10 show the third wheel support unit 5 combined together, and the control rod 54 has its lower portion controlled by the eccentric plate 55, so when the eccentric plate 55 is swung up, the control rod 54 is moved down together with the lock block 56, which also moves down and alters its position a little to become not aligned with the fitting member 530 owing to the inclined surface 531. The control rod 54 has a characteristic of eccentric movement due to the lock block 56. On the contrary, if the eccentric plate 55 is swung down from the swung-up position, the lock block 556 is pushed back upward by recovered elasticity of the spring 536 to the original position.

Therefore, when the fitting member 530 on the connect base 53 and the lock block 56 are inserted in the hollow interior of the lower portion of the main frame 40, swinging up the eccentric plate 55 can move down the control rod 54, with its upper end screwed with the lock block 56 all together moved down likewise, so that the lock block 56 may contact securely with the inner surface of the main frame 40, assembling fixedly the third wheel support unit 5 with the main frame of a golf club cart, as shown in FIG. 10.

Figure 11:
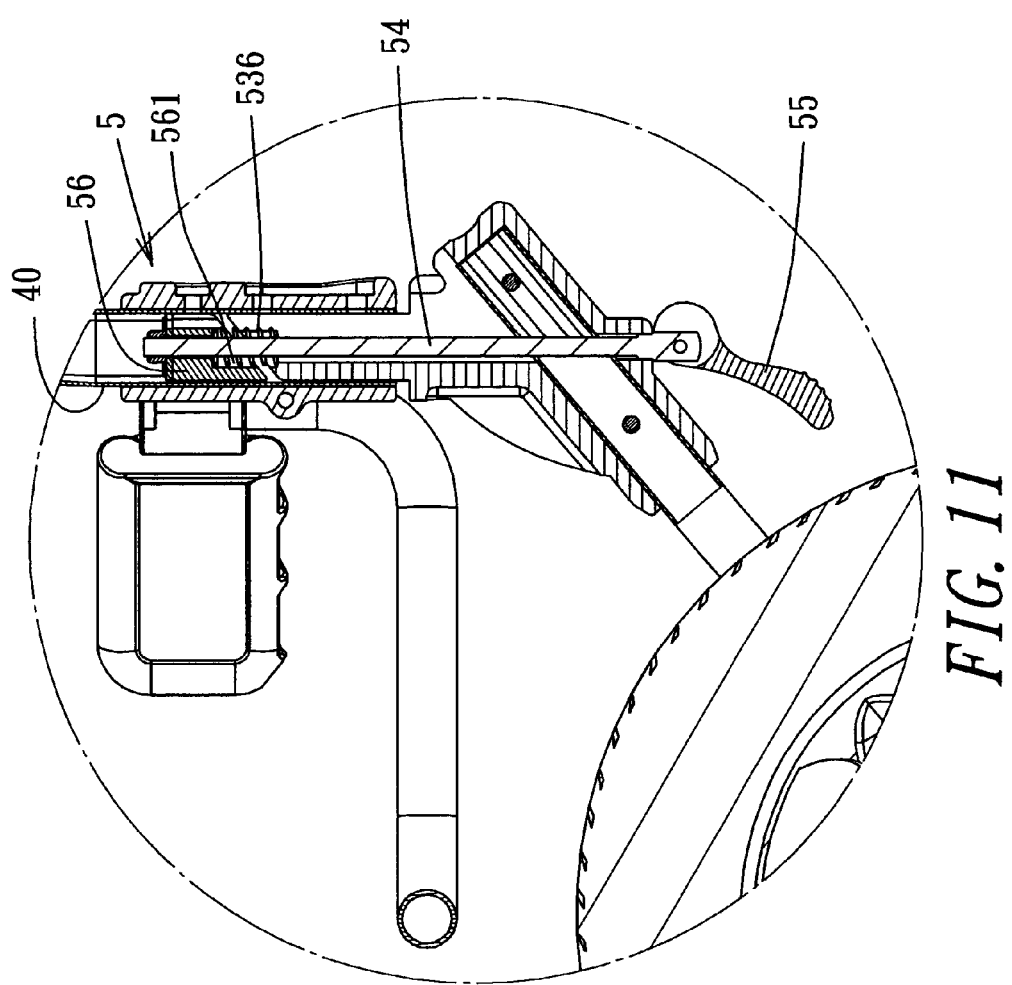
FIG. 11 is a partial magnified view of the third wheel support unit being collapsed from the golf club cart in the present invention.

On the contrary, if the third wheel support unit 5 is to be disassembled from the main frame 40, as shown in FIG. 11, the eccentric plate 55 is swung down from the assembled position shown in FIG. 10 to release the control rod 54, which then moves up to let the spring 536 recover its elasticity of the spring 536 in the spring chamber 561, with the lock block 56 moving up at the same time to separate from the main frame 40 automatically, i.e. permitting the third wheel support unit 5 disassembled (or collapsed) from the main frame 40.

Thus the third wheel collapsing device for a golf club cart in the invention has the following advantages.
1. Its handling is simple, by the eccentric plate swung to move the control rod for locking or unlocking the third wheel support unit with main frame, improving the drawback of the bolt used in the conventional golf club cart.
2. The third wheel support unit has good stability, without possibility of falling off the main frame, owing to the spring having two-direction elastic positioning force, even if the golf club cart should move on rugged surfaces.

While the preferred embodiment of the invention has been described above, it will be recognized and understood that various modifications may be made therein and the appended claims are intended to cover all such modifications that may fall within the spirit and scope of the invention.

What is claimed is:

1. A third wheel collapsing device for a golf club cart comprising a main frame, a third wheel support unit releasably assembled with a lower end of said main frame, said third wheel support unit comprising:

A U-shaped frame having an opening with a third wheel pivotally connected therein, and an arm extending outward from a closed end, said arm having a center hole in an intermediate portion and plural sidewise holes in its one side a connect base having a hollow interior to fit around said arm, a fitting member extending obliquely from an upper end and provided with an upper inclined surface, a through hole to align with said center hole of said arm, plural locking holes spaced apart in a side for bolts to be threaded into said connect base with said arm firmly, a spring chamber provided in said center hole of said fitting member base for receiving a spring therein an elongate control rod having its lower end connected pivotally with a swingable eccentric plate a lock block positioned on said upper inclined surface of said fitting member of said connect base, having a center hole aligned with said center hole of said fitting member, said center hole having its lower portion formed with a spring chamber for receiving an upper portion of said spring received in said spring chamber of said fitting member, said control rod extending through said center holes of both said fitting member and said lock block and exposed out of said lock block and tightened firmly with a nut said control rod controlled by said eccentric plate, said control rod moved down by swinging up said eccentric plate so that said lock block fixed with an upper end of said control rod may be moved down together and alter its position a little by sliding on the upper inclined surface of the fitting member to let said lock block not be aligned axially with said fitting member, thus said third wheel support unit securely assembled with said main frame by tight contact of said lock block with an inner surface of said main frame when said fitting member with said lock block are inserted in said main frame, said lock block being pushed up by recovered elasticity of said spring in said spring chamber when said eccentric plate is swung down to permit said control rod to be moved up by said spring recovering its elasticity, thus said third wheel support unit together with said third wheel is disassembled from said main frame.

* * * * *